United States Patent
Park et al.

(10) Patent No.: US 8,130,622 B2
(45) Date of Patent: Mar. 6, 2012

(54) OPTICAL PICKUP APPARATUS HAVING MULTI-SECTIONAL POLARIZER

(75) Inventors: Seong-su Park, Hwaseong-si (KR); Soo-han Park, Yongin-si (KR); Bong-gi Kim, Suwon-si (KR); Ichiro Morishita, Yokohama (JP); Myoung-seok Kim, Seoul (KR); Jung-woo Hong, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 12/761,495

(22) Filed: Apr. 16, 2010

(65) Prior Publication Data
US 2011/0063968 A1 Mar. 17, 2011

(30) Foreign Application Priority Data
Sep. 14, 2009 (KR) .................. 10-2009-0086462

(51) Int. Cl.
*G11B 7/00* (2006.01)
*G11B 7/135* (2006.01)
(52) U.S. Cl. ......... 369/112.16; 369/112.23; 369/110.02; 369/110.04; 369/112.17; 369/112.19
(58) Field of Classification Search ............ 369/112.23, 369/110.02, 110.04, 112.16, 112.17, 112.19
See application file for complete search history.

(56) References Cited

U.S. PATENT DOCUMENTS

| | | | |
|---|---|---|---|
| 2004/0190417 A1* | 9/2004 | Watanabe et al. | 369/53.11 |
| 2005/0180294 A1* | 8/2005 | Kimura et al. | 369/112.05 |
| 2008/0068939 A1* | 3/2008 | Tanaka et al. | 369/44.14 |
| 2008/0232203 A1* | 9/2008 | Ogasawara et al. | 369/44.23 |
| 2009/0016191 A1* | 1/2009 | Murata et al. | 369/110.01 |
| 2009/0046548 A1* | 2/2009 | Katayama | 369/44.32 |

FOREIGN PATENT DOCUMENTS

| | | |
|---|---|---|
| DE | 10056561 | 6/2001 |
| WO | 2008/039156 | 4/2008 |

OTHER PUBLICATIONS

European Search Report issued Nov. 30, 2010 in EP Application No. 10166892.9.
Dorn et al.—"Sharper Focus for a Radially Polarized Light Beam" - Physical Review Letters, American Physical Society, New York, US, vo., 91, No. 23, Dec. 2, 2003, pp. 233901/1-233901/4, XP-002592881, ISSN: 0031-9007, DOI, DOI:10.1103/Physrevlett. 99.233901.

* cited by examiner

*Primary Examiner* — Joseph Feild
*Assistant Examiner* — Aneeta Yodichkas
(74) *Attorney, Agent, or Firm* — Stanzione & Kim, LLP (57) ABSTRACT

An optical pickup apparatus includes a light generating unit to generate a light to record or reproduce information, an objective lens to focus the light generated from the light generating unit onto a disk, and a multi-sectional polarizer disposed on a light path between the light generating unit and the objective lens and divided into a plurality of sectors having their individual optical axes.

17 Claims, 7 Drawing Sheets

OPTICAL PICKUP APPARATUS HAVING MULTI-SECTIONAL POLARIZER

CROSS-REFERENCE TO RELATED APPLICATIONS

This application claims priority under 35 U.S.C. §119 (a) from Korean Patent Application No. 10-2009-0086462, filed on Sep. 14, 2009, in the Korean Intellectual Property Office, the disclosure of which is incorporated herein by reference in its entirety.

BACKGROUND

1. Field of the Invention

The present general inventive concept relates to an optical pickup apparatus, and more particularly, to an optical pickup apparatus having a multi-sectional polarizer.

2. Description of the Related Art

An optical pickup apparatus is used to record information onto an optical disc using light or to reproduce the information recorded on the optical disc. The optical pickup apparatus includes an objective lens to focus light onto an optical disc. Representative examples of an optical disc may include a Compact Disc (CD) using a laser with a wavelength of 780 nm, and a Digital Versatile Disc (DVD) using a laser with a wavelength of 650 nm. Recently, in order to further increase the recording density, a Blu-ray Disc (BD) using a blue-violet laser with a wavelength of about 405 nm has been used.

A blu-ray disc uses light with a shorter wavelength compared to a CD and a DVD, and accordingly a numerical aperture (NA) of an objective lens for the blu-ray disc is greater than a numerical aperture of an objective lens for the CD and a numerical aperture of an objective lens for the DVD. For example, the objective lens for the CD has a numerical aperture of 0.45, the objective lens for the DVD has a numerical aperture of 0.55, and the objective lens for the blu-ray disc has a numerical aperture of 0.85.

Herein, the numerical aperture refers to a parameter defined as a combination of an external diameter and a focal distance of a lens. In general, as a numerical aperture of a lens increases, the lens becomes more convex. Accordingly, in order to minimize an optical aberration, a lens having a greater numerical aperture requires more precise processing.

In other words, the objective lens for the blu-ray disc having a numerical aperture significantly greater than the numerical aperture of the objective lens for the CD and numerical aperture of the objective lens for the DVD needs to be manufactured through processes with high precision. Accordingly, the objective lens for the blu-ray disc may have a narrow allowable range of manufacturing tolerances, and thus costs of an optical pickup apparatus for the blu-ray disc may increase.

An optical pickup apparatus may be compatible with a CD, a DVD and a blu-ray disc, so as to be employed for the use of the CD, the DVD and the blu-ray disc. This compatible optical pickup apparatus may include a compatible objective lens to be applied to all the CD, the DVD and the blu-ray disc.

To use the compatible optical pickup apparatus, it is particularly important that a working distance (WD) between the compatible objective lens and the CD should be ensured to be equal to or greater than a default value, for example 0.4 mm. If the working distance does not reach the default value, it is highly likely that inadvertent contact between the CD and the objective lens occurs during working, which results in damage to the CD or the objective lens.

In the case of using the blu-ray disc, when the compatible objective lens has a numerical aperture of 0.85, a focal distance is substantially equal to or greater than 2.2 mm so that the working distance between the CD and the compatible objective lens may be ensured to be equal to or greater than 0.4 mm.

However, the compatible objective lens having the focal distance of about 2.2 mm with respect to the blu-ray disc is contrary to a demand for slimness of the optical pickup apparatus, taking into consideration that an objective lens currently used in a slim optical pickup apparatus has a focal distance of about 1.4 mm with respect to the blu-ray disc.

SUMMARY

Example embodiments of the present general inventive concept provide an optical pickup apparatus to widen an allowable range of manufacturing tolerances while maintaining a recording density at the same level as before. Also, example embodiments of the present general inventive concept provide a compatible optical pickup apparatus to meet a demand for slimness while maintaining a reference working distance (WD) with respect to a Compact Disc (CD).

Additional features and utilities of the present general inventive concept will be set forth in part in the description which follows and, in part, will be obvious from the description, or may be learned by practice of the general inventive concept.

Features and/or utilities of the present general inventive concept may be achieved by an optical pickup apparatus including a light generating unit to generate a light to record or reproduce information, an objective lens to focus the light generated from the light generating unit onto a disk, and a multi-sectional polarizer positioned along a light path between the light generating unit and the objective lens and divided into a plurality of sectors having their individual optical axes.

The multi-sectional polarizer may be manufactured with a half-wavelength plate.

The plurality of sectors of the multi-sectional polarizer may have the same central angle.

The number of the plurality of sectors of the multi-sectional polarizer may be an even-number.

Optical axes of two sectors facing each other may be parallel to each other.

When a center line of any one of the sectors is an X-axis and when an angle between the X-axis and a center line of the respective sector is θ, a value of α indicating a direction of an optical axis of the respective sector may be determined by the following equations:

$$\alpha = -\tfrac{1}{2} \times \theta + 45° \text{ for } 0° \leq \theta < 90°;$$

$$\alpha = \tfrac{1}{2} \times \theta - 45° \text{ for } 90° \leq \theta < 180°;$$

$$\alpha = -\tfrac{1}{2} \times \theta - 45° \text{ for } 180° \leq \theta < 270°; \text{ and}$$

$$\alpha = \tfrac{1}{2} \times \theta + 45° \text{ for } 270° \leq \theta < 360°.$$

Optical axes of two sectors facing each other may be perpendicular to each other.

When a center line of any one of the sectors is an X-axis and when an angle between the X-axis and a center line of the respective sector is θ, a value of α indicating a direction of an optical axis of the respective sector may be determined by the following equation:

$$\alpha = \tfrac{1}{2} \times \theta + 45°.$$

The multi-sectional polarizer may face the objective lens.

The light generating unit may include at least one of a light source for a Compact Disc (CD), a light source for a Digital Versatile Disc (DVD) and a light source for a Blu-ray Disc.

The light generating unit may include the light source for a blu-ray disc only.

A numerical aperture (NA) of the objective lens may be equal to or greater than 0.70 and less than 0.85.

The light generating unit may include a light source for a CD, a light source for a DVD and a light source for a blu-ray disc. The objective lens may be a compatible objective lens compatible with a CD, a DVD and a blu-ray disc.

The objective lens may have a numerical aperture of 0.76 with respect to a blu-ray disc, a numerical aperture of 0.53 with respect to a DVD, and a numerical aperture of 0.44 with respect to a CD.

The light generating unit may include a two-wavelength light source module comprising the light source for the CD and the light source for the DVD, and a light source module for a blu-ray disc comprising the light source for the blu-ray disc.

The optical pickup apparatus may include a photodetector to detect the light reflected from the disk, a first beam splitter to reflect a light emitted from the two-wavelength light source module and to transmit a light emitted from the light source module for the blu-ray disc, and a second beam splitter to reflect the light incident from the first beam splitter toward the objective lens and to transmit the light incident from the objective lens toward the photodetector.

When a P-polarized light enters, the second beam splitter may reflect one half of the P-polarized light and transmit the other half of the P-polarized light.

Features and/or utilities of the present general inventive concept may also be realized by a data storage apparatus including a disc to store data and an optical pickup apparatus to perform at least one of reading data from the disc and writing data to the disc.

The optical pickup apparatus may include a multi-sectional polarizer including at least two sections each having a respective optical axis to polarize light passing through the multi-sectional polarizer to the disc into at least two different orientations according to the respective optical axes.

The disc may be one of a CD, a DVD, and a blu-ray disc.

The optical device may further include a controller to control the optical pickup to read data from and write data to the disc.

BRIEF DESCRIPTION OF THE DRAWINGS

These and/or other embodiments of the present general inventive concept will become apparent and more readily appreciated from the following description of the exemplary embodiments, taken in conjunction with the accompanying drawings of which.

DETAILED DESCRIPTION OF THE EMBODIMENTS

Reference will now be made in detail to exemplary embodiments of the present general inventive concept, examples of which are illustrated in the accompanying drawings, wherein like reference numerals refer to the like elements throughout. The exemplary embodiments are described below in order to explain the present general inventive concept by referring to the figures.

Hereinafter, an optical pickup apparatus 100 according to a first exemplary embodiment of the present general inventive concept will be described with reference to FIGS. 1 to 6. The optical pickup apparatus 100 is exemplified as an optical pickup apparatus for a Blu-ray Disc, and the following description of the first exemplary embodiment of the present general inventive concept may also be applied to an optical pickup apparatus for a Compact Disc (CD) or an optical pickup apparatus for a Digital Versatile Disc (DVD).

Figure 1:
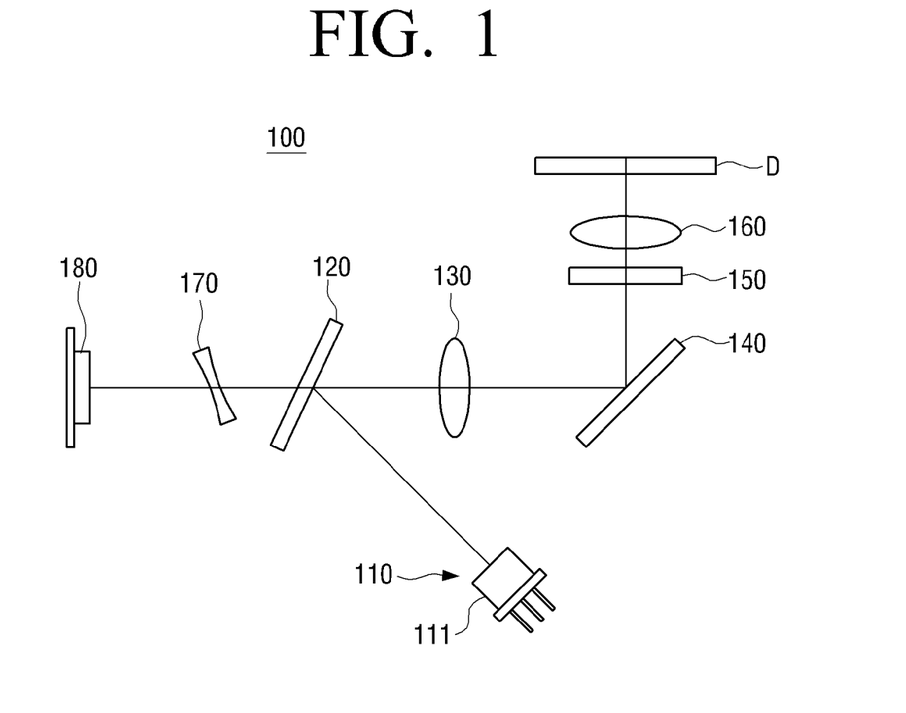
FIG. 1 is a schematic view illustrating an optical pickup apparatus according to a first exemplary embodiment of the present general inventive concept.

FIG. 1 schematically illustrates the optical pickup apparatus 100 according to the first exemplary embodiment of the present general inventive concept.

In FIG. 1, the optical pickup apparatus 100 includes a light generating unit 110, a beam splitter 120, a collimating lens 130, a reflective mirror 140, a multi-sectional polarizer 150, an objective lens 160, a sensor lens 170 and a photodetector 180.

The light generating unit 110 can generate light that is applicable to an optical disc D such as a blu-ray disc. Accordingly, the light generating unit 110 can include an optical module for the blu-ray disc 111, which has a light source (not illustrated) to emit light with a wavelength of about 405 nm.

The light source included in the optical module for the blu-ray disc 111 may be implemented as a laser diode. The light generated from the light generating unit 110 is P-polarized light having a single vibration direction, according to essential characteristics of a laser.

The beam splitter 120 can reflect part of the light generated from the light generating unit 110 toward the reflective mirror 140. Additionally, the beam splitter 120 can transmit part of light reflected from the optical disc D toward the photodetector 180.

In more detail, the beam splitter 120 has properties to reflect one half of the P-polarized light and transmit the other half when the P-polarized light enters. Accordingly, the beam splitter 120 can reflect one half of the light generated from the light generating unit 110, and can transmit one half of the light reflected from the optical disc D. Thus, only a quarter of the light generated from the light generating unit 110 may reach the photodetector 180. However, an amount of light generated from the light generating unit 110 may be appropriately regulated, and thus it is possible to prevent problems such as non-detection of light or false detection of light.

The collimating lens 130 is an element to convert light into parallel light. The collimating lens 130 may be disposed between the beam splitter 120 and the reflective mirror 140. In more detail, the collimating lens 130 can convert the light generated from the light generating unit 110 into parallel light, before the generated light is incident onto the objective lens 160.

The reflective mirror 140 may be disposed between the collimating lens 130 and the multi-sectional polarizer 150. The reflective mirror 140 can reflect the light transferred from the beam splitter 120, toward the objective lens 160. Additionally, the reflective mirror 140 can reflect the light, which is reflected from the optical disc D and passes through the objective lens 160 and the multi-sectional polarizer 150, toward the beam splitter 120.

The multi-sectional polarizer 150 may be placed on a light path between the light generating unit 110 and the objective lens 160. In more detail, the multi-sectional polarizer 150 may be disposed between the reflective mirror 140 and the objective lens 160, so as to face the objective lens 160. The multi-sectional polarizer 150 is an element to change the polarization status of light, and has an optical anisotropy. Additionally, the multi-sectional polarizer 150 may be manufactured with a half-wavelength plate to generate a phase difference of 180°. The multi-sectional polarizer 150 will be described in greater detail below.

The objective lens 160 can focus the light generated from the light generating unit 110 onto the optical disc D. In the exemplary embodiment of the present general inventive concept, a numerical aperture (NA) of the objective lens 160 is less than or equal to a typical value. In other words, an objective lens for the blu-ray disc typically has a numerical aperture of 0.85, but the objective lens 160 has a numerical aperture in a range between 0.70 and 0.85 (namely, $0.70 \leq NA \leq 0.85$).

The sensor lens 170 may be a concave lens, and may be disposed between the beam splitter 120 and the photodetector 180. The sensor lens 170 can convert the light reflected from the optical disc D into light detectable by the photodetector 180.

The photodetector 180 can detect the light reflected from the optical disc D, and convert the detected light into an electrical signal. Information recorded on the optical disc D and a control signal required to operate the optical pickup apparatus 100 can be obtained from the electrical signal.

The multi-sectional polarizer 150 is now described in greater detail with reference to FIGS. 2 to 6.

Figure 2:
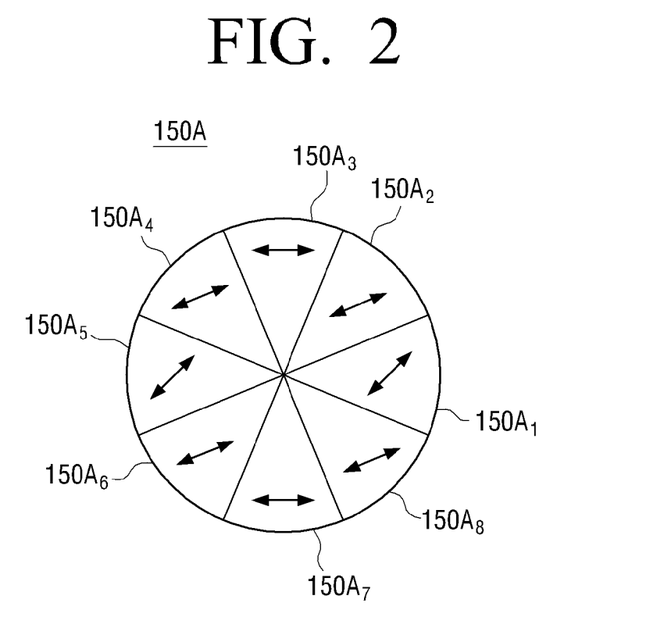
FIG. 2 is a schematic view of a first embodiment of a multi-sectional polarizer according to the present general inventive concept.
Figure 3:
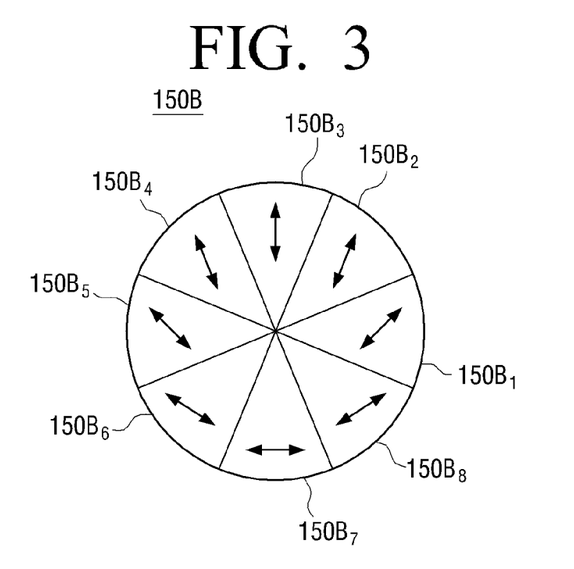
FIG. 3 is a schematic view of a second embodiment of a multi-sectional polarizer according to the present general inventive concept.
Figure 4:
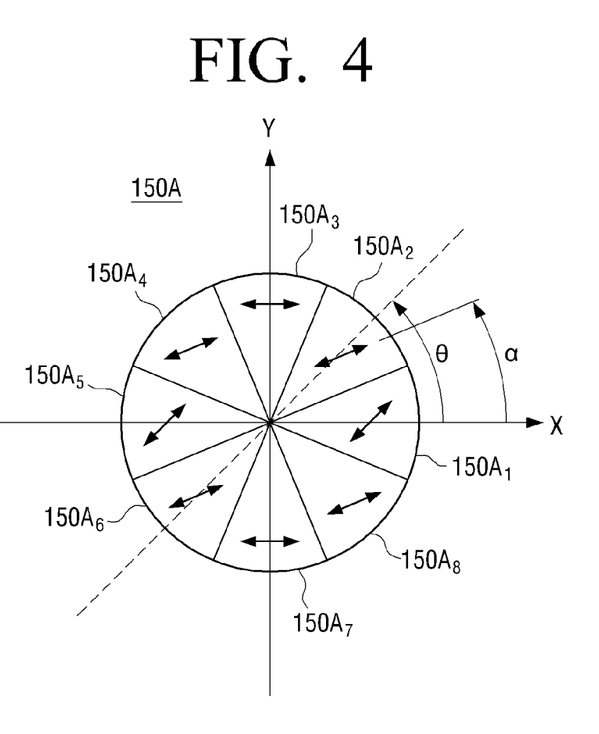
FIG. 4 is a view explaining a direction of an optical axis in the first embodiment of the multi-sectional polarizer according to the present general inventive concept.
Figure 5:
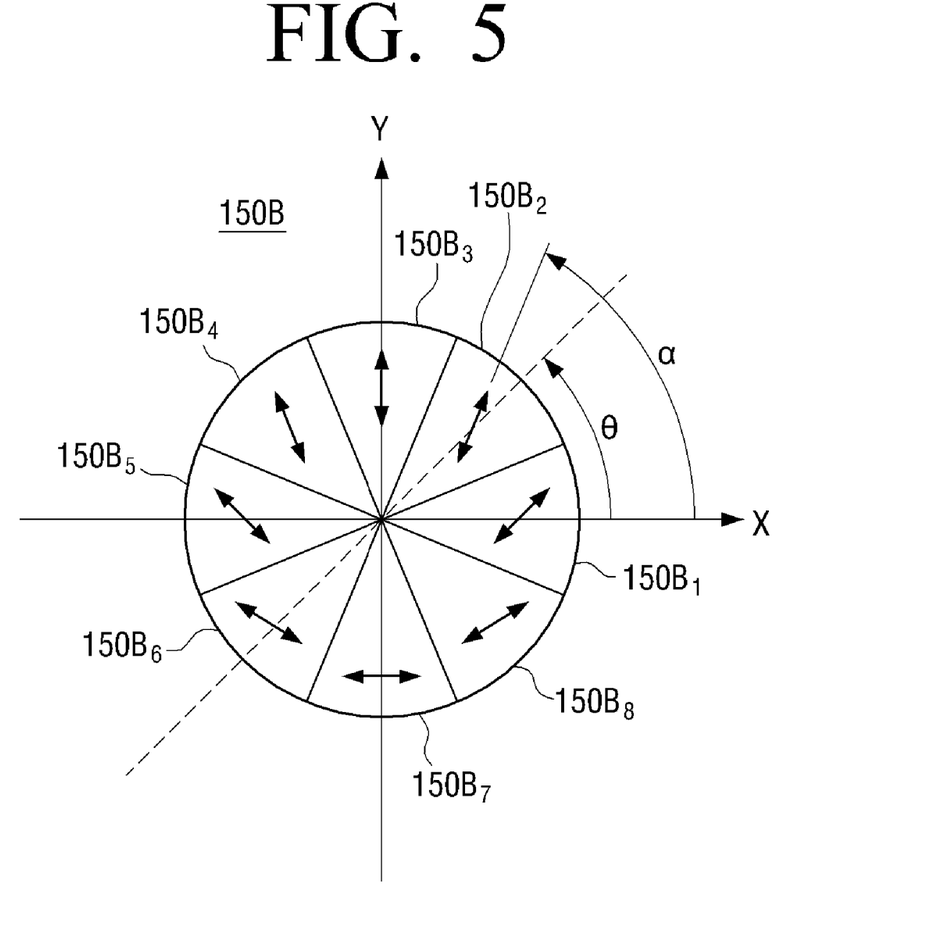
FIG. 5 is a view explaining a direction of an optical axis in the second embodiment of the multi-sectional polarizer according to the present general inventive concept.
Figure 6:
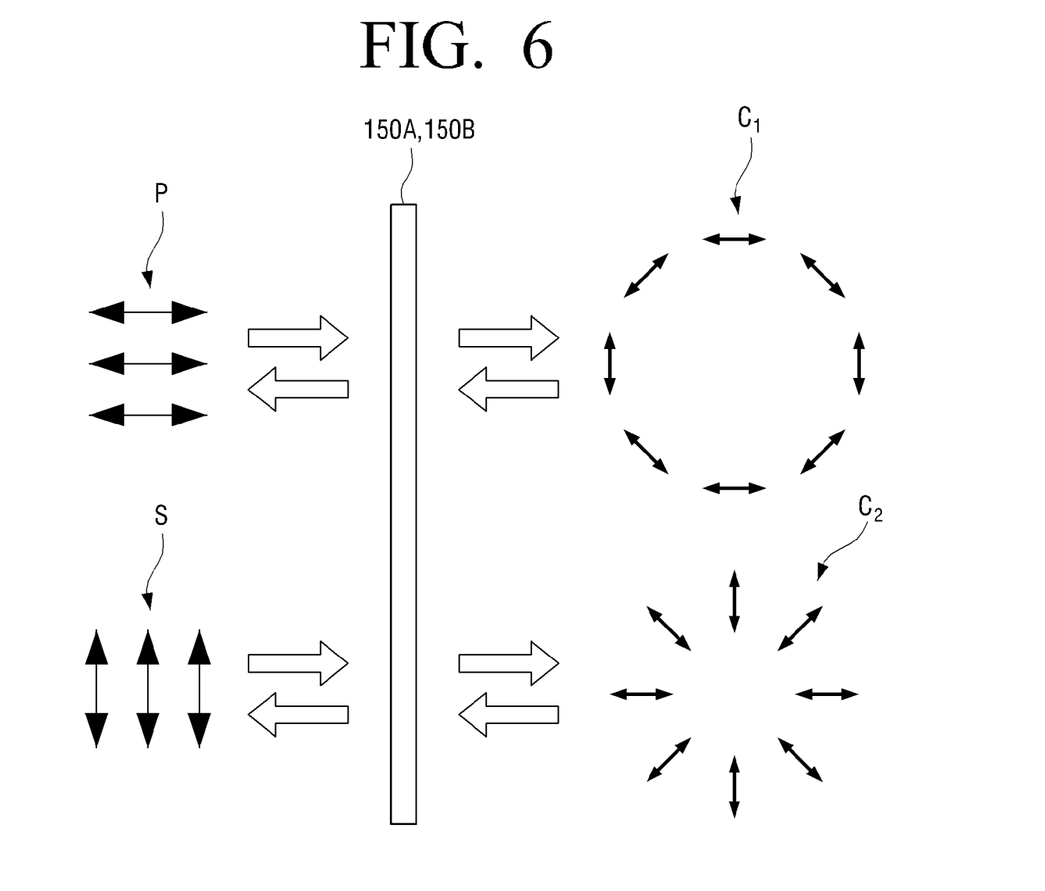
FIG. 6 illustrate operations of a multi-sectional polarizer according to the present general inventive concept.

FIG. 2 is a schematic view of a first embodiment of a multi-sectional polarizer according to the present general inventive concept, FIG. 3 is a schematic view of a second embodiment of a multi-sectional polarizer according to the present general inventive concept, FIG. 4 is a view explaining a direction of an optical axis in the first embodiment of the multi-sectional polarizer according to the present general inventive concept, FIG. 5 is a view explaining a direction of an optical axis in the second embodiment of the multi-sectional polarizer according to the present general inventive concept, and FIG. 6A is a view explaining operations of a multi-sectional polarizer according to the present general inventive concept.

Referring to FIGS. 2 and 3, a multi-sectional polarizer 150A according to the first exemplary embodiment of the present general inventive concept and a multi-sectional polarizer 150B according to the second exemplary embodiment of the present general inventive concept can take the form of disks. Each of the multi-sectional polarizers 150A and 150B can be divided into a plurality of fan-shaped sectors having the same central angle. However, the multi-sectional polarizers 150A and 150B are not limited to the disk shape, and the plurality of sectors is not limited to the fan shape. The number of sectors included in the multi-sectional polarizers 150A and 150B is an even-number, and may desirably be equal to or greater than 4. In FIGS. 2 and 3, each of the multi-sectional polarizers 150A and 150B has eight sectors.

As illustrated in FIGS. 2 and 3, reference numerals 150A1, 150A2, . . . , 150A7 and 150A8 are successively assigned to the eight sectors of the multi-sectional polarizer 150A counterclockwise, and reference numerals 150B1, 150B2, . . . , 150B7 and 150B8 are successively assigned to the eight sectors of the multi-sectional polarizer 150B counterclockwise. Additionally, each arrow illustrated on each sector indicates a direction of an optical axis of a sector.

In the multi-sectional polarizer 150A of FIG. 2, optical axes of two sectors facing each other are parallel to each other. For example, an optical axis of a second sector 150A2 is parallel to an optical axis of a sixth sector 150A6. On the other hand, in the multi-sectional polarizer 150B of FIG. 3, optical axes of two sectors facing each other are perpendicular to each other. For example, an optical axis of a third sector 150B3 is perpendicular to an optical axis of a seventh sector 150B7.

The direction of the optical axis for each sector of the multi-sectional polarizers 150A and 150B may be represented by equations.

Hereinafter, equations applied to the multi-sectional polarizer 150A will be described with reference to FIG. 4. When a center line of a first sector 150A1 is an X-axis and when an angle between the X-axis and a center line of a predetermined sector is θ, a value of α indicating a direction of an optical axis of the predetermined sector may be determined by the following equations:

$\alpha = -\frac{1}{2} \times \theta + 45°$ for $0° \leq \theta < 90°$;

$\alpha = \frac{1}{2} \times \theta - 45°$ for $90° \leq \theta < 180°$;

$\alpha = -\frac{1}{2} \times \theta - 45°$ for $180° \leq \theta < 270°$; and $\alpha = \frac{1}{2} \times \theta + 45°$ for $270° \leq \theta < 360°$.

For example, in the case of a fourth sector 150A4, angle θ4 between the X-axis and a center line of the fourth sector 150A4 is 135°, and accordingly a value of α4 may be 22.5° ($\alpha 4 = \frac{1}{2} \times 135° - 45° = 22.5°$). In the case of a seventh sector 150A7, angle θ7 between the X-axis and a center line of the seventh sector 150A7 is 270°, and accordingly a value of α7 may be 180° ($\alpha 7 = \frac{1}{2} \times 270° - 45° = 180°$).

Hereinafter, an equation applied to the multi-sectional polarizer 150B will be described with reference to FIG. 5. When a center line of a first sector 150B1 is an X-axis and when an angle between the X-axis and a center line of a predetermined sector is θ, a value of α indicating a direction of an optical axis of the predetermined sector may be determined by the following equation:

$\alpha = \frac{1}{2} \times \theta + 45°$.

For example, in the case of a fourth sector 150B4, angle θ4 between the X-axis and a center line of the fourth sector 150B4 is 135°, and accordingly a value of α4 may be 112.5° ($\alpha 4 = \frac{1}{2} \times 135° - 45° = 22.5°$). In the case of a seventh sector 150B7, angle θ7 between the X-axis and a center line of the seventh sector 150B7 is 270°, and accordingly a value of α7 may be 180° ($\alpha 7 = \frac{1}{2} \times 270° - 45° = 180°$).

Referring to FIG. 6, the multi-sectional polarizers 150A and 150B, which each have the plurality of sectors having their individual optical axes, can convert P-polarized light P that is one of linearly polarized light into concentric linearly polarized light $C_1$ formed by combining a plurality of linearly polarized light beams which vibrate in tangential directions of concentric circles, and can convert S-polarized light S that is the other of linearly polarized light into concentric linearly polarized light $C_2$ formed by combining a plurality of linearly polarized light beams which vibrate in radial directions of a single center. The linearly polarized light refers to light having a single vibration direction, for example P-polarized light or S-polarized light, and the concentric linearly polarized light refers to light formed by combining a plurality of linearly polarized light beams which have vibration directions along tangential directions of concentric circles or have vibration directions along radiation directions from a single core. As illustrated in FIG. 6A, the multi-sectional polarizers 150A and 150B can also convert the concentric linearly polarized light $C_1$ and $C_2$ into the linearly polarized light P and S, respectively.

In other words, the multi-sectional polarizers 150A and 150B can convert the linearly polarized light P and S into the concentric linearly polarized light $C_1$ and $C_2$, and can convert the concentric linearly polarized light $C_1$ and $C_2$ into the linearly polarized light P and S.

Referring back to FIG. 1, the P-linearly polarized light generated from the light generating unit 110 can be converted into the concentric linearly polarized light by the multi-sectional polarizer 150, and can then be incident onto the objective lens 160. Additionally, the concentric linearly polarized light reflected from the optical disc D can be converted into the P-linearly polarized light by the multi-sectional polarizer 150, and can then be incident onto the reflective mirror 140.

As described above, after the linearly polarized light generated from the light generating unit 110 is converted into the concentric linearly polarized light, the converted light is incident onto the objective lens 160, and accordingly a diameter of a spot formed on the optical disc D can be reduced, as illustrated in Table 1.

TABLE 1

| | Linearly polarized light | | | Circularly polarized light | Concentric linearly polarized light |
|---|---|---|---|---|---|
| | Major axis | Minor axis | Ellipticity | | |
| BD | 0.300 | 0.235 | 1.28 | 0.263 | 0.235 |
| DVD | 0.650 | 0.605 | 1.07 | 0.624 | 0.605 |
| CD | 0.936 | 0.890 | 1.05 | 0.913 | 0.890 |

Data of Table 1 is obtained by computing the diameter of spots formed on a blu-ray disc, a DVD and a CD when the linearly polarized light, the circularly polarized light and the concentric linearly polarized light are applied to an objective lens of an optical pickup apparatus. Herein, the circularly polarized light refers to polarized light which rotates in a direction perpendicular to the vibration direction.

As illustrated in Table 1, in the case of the blu-ray disc, when the linearly polarized light is applied to the objective lens, a spot is formed with a major axis of 0.300 μm, a minor axis of 0.235 μm and an ellipticity of 1.28, whereas when the circularly polarized light is applied to the objective lens, a spot is formed with a diameter d1 of 0.263 μm. Additionally, when the concentric linearly polarized light is applied to the objective lens, a spot is formed with a diameter d2 of 0.235 μm. Accordingly, when the concentric linearly polarized light is applied to the objective lens, the diameter of the spot is reduced by 22% compared to when the linearly polarized light is applied ((0.300−0.235)/0.300×100%=22%), and is reduced by 10% compared to when the circularly polarized light is applied ((0.263−0.235)/0.263×100%=11%).

Likewise, in the case of the DVD and CD, the diameter of spots formed when the concentric linearly polarized light is applied to the objective lens is reduced compared to when the linearly polarized light or the circularly polarized light is applied.

Consequently, when the concentric linearly polarized light is applied to the objective lens, the diameter of the spot can be reduced. The diameter of the spot can be significantly reduced as the numerical aperture of the objective lens increases. In other words, when the multi-sectional polarizer 150 to generate concentric linearly polarized light is used, the recording density can be maintained at the same level as before, even though the numerical aperture of the objective lens 160 is reduced.

Therefore, the multi-sectional polarizer 150 can reduce the diameter of the spot even when the numerical aperture of the objective lens 160 in the optical pickup apparatus 100 is equal to or greater than 0.70 and less than 0.85 (namely, a typical numerical aperture), and it is thus possible to realize the recording density at the same level as before. Accordingly, the allowable range of manufacturing tolerances of the objective lens 160 can be widened, and thus a yield of the objective lens 160 can be increased, thereby reducing production costs of the optical pickup apparatus 100.

Figure 7:
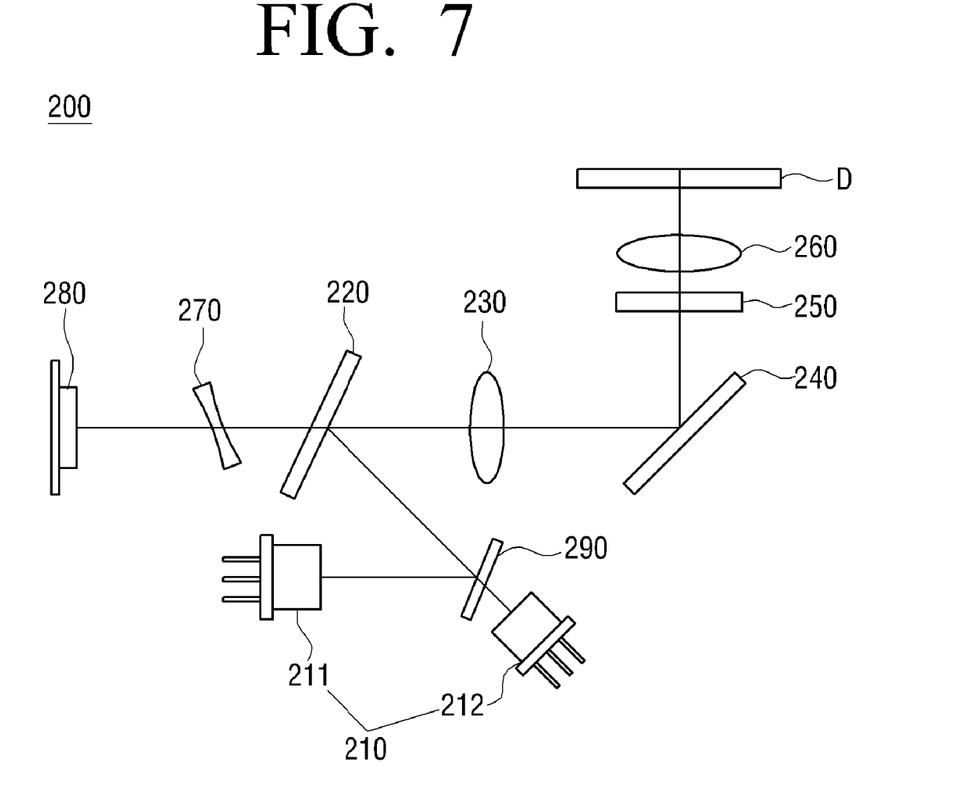
FIG. 7 is a schematic view illustrating a compatible optical pickup apparatus according to a second exemplary embodiment of the present general inventive concept.

Hereinafter, an optical pickup apparatus 200 according to the second exemplary embodiment of the present general inventive concept will be described with reference to FIG. 7. FIG. 7 is a schematic view illustrating the optical pickup apparatus 200 according to a second exemplary embodiment of the present general inventive concept.

In FIG. 7, the optical pickup apparatus 200 includes a light generating unit 210, a first beam splitter 290, a second beam splitter 220, a collimating lens 230, a reflective mirror 240, a multi-sectional polarizer 250, an objective lens 260, a sensor lens 270 and a photodetector 280.

The above-described optical pickup apparatus 100 according to the first exemplary embodiment is applicable to one of a CD, a DVD and a blu-ray disc, whereas the optical pickup apparatus 200 according to the second exemplary embodiment is a compatible optical pickup apparatus which is compatible with all of the CD, DVD and blu-ray disc. Accordingly, the light generating unit 210 of the optical pickup apparatus 200 can include each of the light source for the CD, the light source for the DVD, and the light source for the blu-ray disc.

The light generating unit 210 includes a two-wavelength light source module 211 and a light source module for the blu-ray disc 212. The two-wavelength light source module 211 includes a light source for the CD and a light source for the DVD which are not illustrated. For example, the light source for the CD may be a laser diode to emit light with a wavelength of 780 nm, and the light source for the DVD may be a laser diode to emit light with a wavelength of 650 nm. Additionally, the light source module for the blu-ray disc 212 includes, although not illustrated, a light source for the blu-ray disc which may be, for example, a laser diode to emit light with a wavelength of 405 nm.

The first beam splitter 290 can transmit light emitted from the light source module for the blu-ray disc 212 toward the second beam splitter 220 without any reflection, and can reflect light emitted from the two-wavelength light source module 211 toward the second beam splitter 220. The second beam splitter 220 may have the same configuration as the beam splitter 120 of the optical pickup apparatus 100 according to the first exemplary embodiment.

The objective lens 260 may be included as a compatible objective lens. In more detail, the objective lens 260 can be a combined lens applicable to each of the light source for the CD, light source for the DVD and light source for the blu-ray disc. Accordingly, the objective lens 260 may have a shape most suitable for the light source for the blu-ray disc, and may have a diffraction structure on one surface thereof (for example, a hologram structure or grating structure) in order to apply the light source for the CD and light source for the DVD.

Other constituents of the optical pickup apparatus 200 according to the second exemplary embodiment have substantially the same configuration as those of the optical pickup apparatus 100 according to the first exemplary embodiment, so no further description thereof is herein provided.

Since the optical pickup apparatus 200 according to the second exemplary embodiment also includes the multi-sectional polarizer 250, the diameter of spots on the disc can be reduced. Accordingly, it is possible to reduce a numerical aperture of the objective lens 260 while maintaining the recording density. Therefore, in the second exemplary embodiment, the numerical aperture of the compatible objective lens 260 can be reduced to 0.76, 0.53 and 0.44 in the case of a blu-ray disc, a DVD and a CD, respectively. In general, the numerical aperture of the objective lens 260 is 0.85, 0.55 and 0.45 with respect to the blu-ray disc, the DVD and the CD, respectively. As described above, the numerical aperture of the objective lens 260 is reduced, and thus the allowable range of manufacturing tolerances of the objective lens 260 can be increased.

According to reduction in the numerical aperture of the objective lens 260, the compatible optical pickup apparatus 200 may have additional advantages, which will be described with reference to Tables 2 and 3.

TABLE 2

| | NA | Focal distance (mm) | Working distance (mm) |
|---|---|---|---|
| BD | 0.85 | 2.20 | 0.69 |
| DVD | 0.55 | 2.36 | 0.59 |
| CD | 0.45 | 2.46 | 0.41 |

Table 2 illustrates the specification of an objective lens of a conventional compatible optical pickup apparatus. In Table 2, focal distances for the blu-ray disc, the DVD and the CD are set to be 2.20 mm, 2.36 mm and 2.46 mm, respectively, in order to ensure that a working distance for the CD is greater than 0.40 mm. However, considering that an objective lens currently used in a slim optical pickup apparatus has a focal distance of about 1.4 mm with respect to the blu-ray disc when a numerical aperture is 0.85, the conventional compatible optical pickup apparatus with the specification of Table 2 does not meet a demand for slimness.

TABLE 3

| | NA | Focal distance (mm) | Working distance (mm) |
|---|---|---|---|
| BD | 0.76 | 1.70 | 0.70 |
| DVD | 0.53 | 1.85 | 0.60 |
| CD | 0.44 | 2.00 | 0.40 |

Table 3 illustrates the specification of the objective lens 260 of the compatible optical pickup apparatus 200 according to the present general inventive concept. In Table 3, a working distance for the CD is maintained to 0.40 mm, and focal distances for the blu-ray disc, the DVD and the CD are 1.70 mm, 1.85 mm and 2.00 mm, respectively. In other words, the focal distance of the objective lens 260 with respect to the blu-ray disc, the DVD and the CD can be reduced compared to the conventional compatible optical pickup apparatus. Accordingly, the compatible optical pickup apparatus 200 according to the present general inventive concept can be made slimmer than conventional compatible optical pickup apparatuses.

As the compatible optical pickup apparatus 200 according to the second exemplary embodiment includes the multi-sectional polarizer 250, the numerical aperture of the objective lens 260 can be reduced and while maintaining the same recording density. Additionally, according to a reduction in the numerical aperture of the objective lens 260, the allowable range of manufacturing tolerances of the objective lens 260 can be increased, and also the compatible optical pickup apparatus 200 can be made slimmer.

As described above, the optical pickup apparatuses according to the exemplary embodiments of the present general inventive concept include a multi-sectional polarizer to convert linearly polarized light into concentric linearly polarized light, and thus it is possible to achieve the recording density at the same level as before, even when an objective lens with a numerical aperture smaller than before is employed. Therefore, the numerical aperture of the objective lens may be reduced, and the allowable range of manufacturing tolerances of the objective lens can thus be increased. Additionally, a compatible optical pickup apparatus can be manufactured to meet the demand for slimness while maintaining a working distance for a CD greater than a reference value.

Figure 8A:
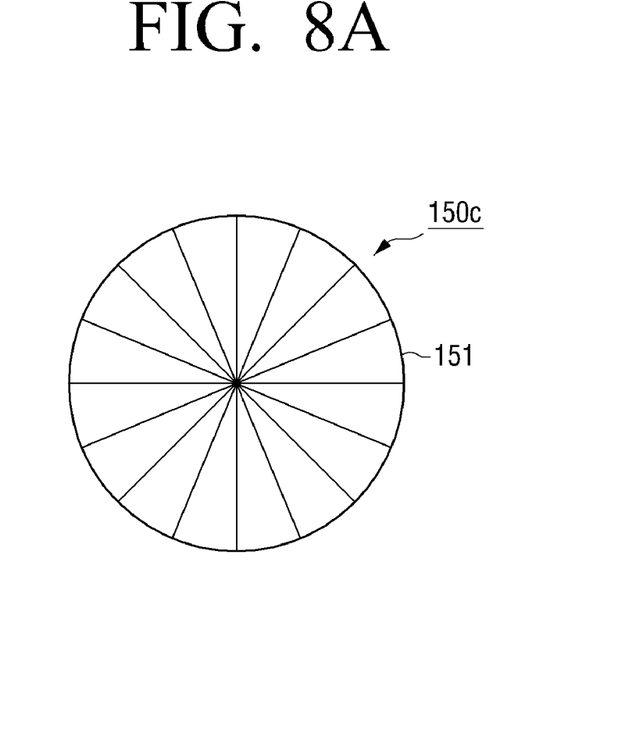
FIGS. 8A and 8B illustrate multi-sectional polarizers according to the present general inventive concept.
Figure 8B:
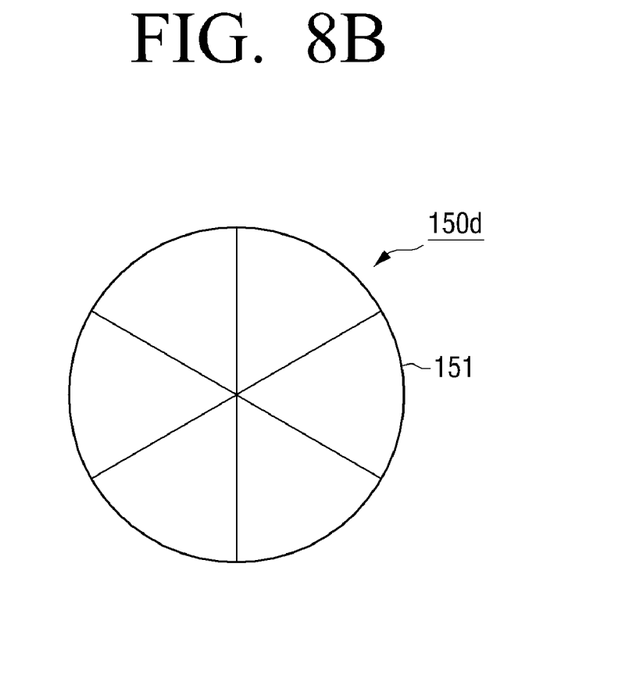

Although above examples illustrate multi-sectional polarizers having eight sections, the multi-sectional polarizer may include any desired number of sections. Accordingly, FIG. 8A illustrates a multi-sectional polarizer 150c having 16 sections 151, and FIG. 8B illustrates a multi-sectional polarizer 150d having 6 sections 151. Operation of the multi-sectional polarizers 150c and 150d is similar to that of 150, 150a, and 150b, described above.

Figure 9:
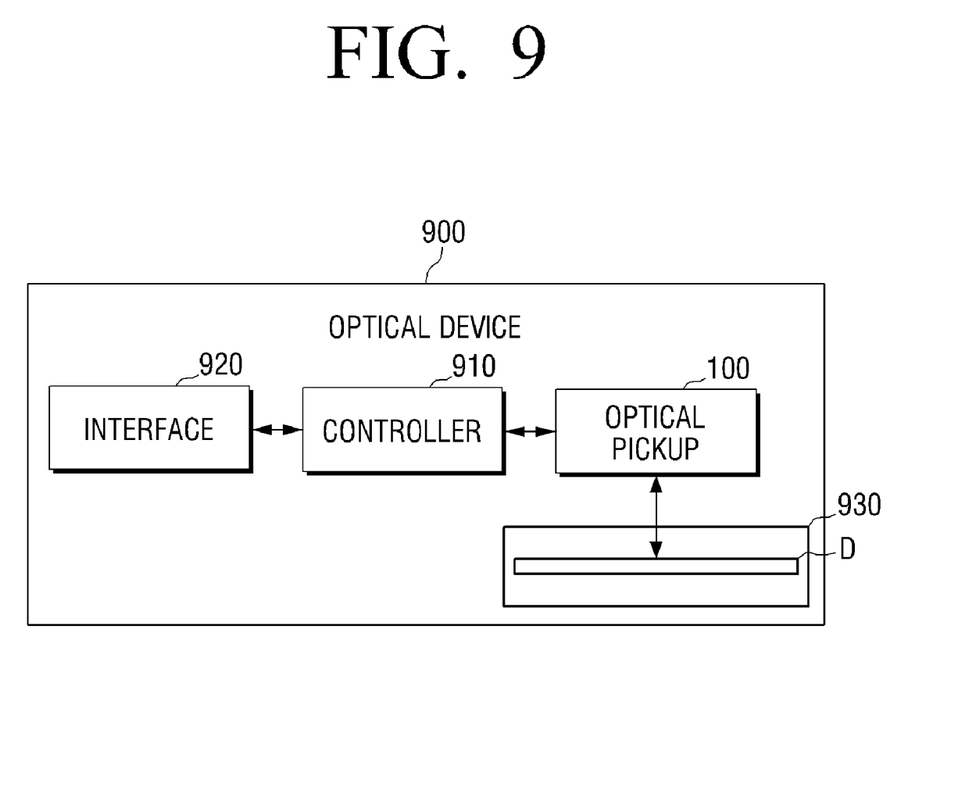
FIG. 9 illustrates an optical device according to the present general inventive concept.

The optical pickup apparatus 100 according to the present general inventive concept may be included in an optical device 900, such as that illustrated in FIG. 9. The optical device 900 may include a disc holder 930 to hold a disc D to store data. A controller 910 may control operation of the optical pickup apparatus 100 to transmit data to and from the disc D. An interface 920 may include one or more electrical ports to communicate with external devices, including wired or wireless ports. In addition, the interface 920 may include a user interface to operate the optical device 900 to transmit data to and from the disc D.

Although a few exemplary embodiments of the present general inventive concept have been illustrated and described, it will be appreciated by those skilled in the art that changes may be made in these exemplary embodiments without departing from the principles and spirit of the general inventive concept, the scope of which is defined in the appended claims and their equivalents.

What is claimed is:

1. An optical pickup apparatus comprising:
   a light generating unit to generate a light to record or reproduce information;
   an objective lens to focus the light generated from the light generating unit onto a disk; and a multi-sectional polarizer located along a light path between the light generating unit and the objective lens and divided into a plurality of sectors, each sector having a respective optical axis, wherein an optical axis of each sector that shares a same center axis is parallel to each other optical axis of each other sector that shares the same center axis, and each optical axis is non-co-linear with a respective center axis, at least two sectors that share a same first center axis are positioned at acute angles with respect to the shared first center axis, and at least two sectors that share a same second center axis are positioned at perpendicular angles with respect to the shared second center axis.

2. The optical pickup apparatus of claim 1, wherein the multi-sectional polarizer comprises a half-wavelength plate.

3. The optical pickup apparatus of claim 2, wherein each of the plurality of sectors of the multi-sectional polarizer has the same central angle.

4. The optical pickup apparatus of claim 3, wherein the number of the plurality of sectors of the multi-sectional polarizer is an even-number.

5. The optical pickup apparatus of claim 1, wherein, when a center line of anyone of the sectors is an X-axis and when an angle between the X-axis and a center line of the respective sector is $\theta$, a value of $\alpha$ indicating a direction of an optical axis of the respective sector is determined by the following equations:

$$\alpha = -\tfrac{1}{2} \times \theta + 45° \text{ for } 0° \leq \theta < 90°;$$

$$\alpha = \tfrac{1}{2} \times \theta - 45° \text{ for } 90° \leq \theta < 180°;$$

$$\alpha = -\tfrac{1}{2} \times \theta - 45° \text{ for } 180° \leq \theta < 270°; \text{ and}$$

$$\alpha = \tfrac{1}{2} \times \theta + 45° \text{ for } 270° \leq \theta < 360°.$$

6. The optical pickup apparatus of claim 1, wherein the multi-sectional polarizer is arranged to face the objective lens.

7. The optical pickup apparatus of claim 1, wherein the light generating unit comprises at least one of a light source for a Compact Disc (CD), a light source for a Digital Versatile Disc (DVD) and a light source for a Blu-ray Disc.

8. The optical pickup apparatus of claim 7, wherein the light generating unit comprises the light source for a blu-ray disc only.

9. The optical pickup apparatus of claim 8, wherein a numerical aperture (NA) of the objective lens is equal to or greater than 0.70 and less than 0.85.

10. The optical pickup apparatus of claim 7, wherein the light generating unit comprises a light source for a CD, a light source for a DVD and a light source for a blu-ray disc, and wherein the objective lens is a compatible objective lens compatible with a CD, a DVD and a blu-ray disc.

11. The optical pickup apparatus of claim 10, wherein the objective lens has a numerical aperture of 0.76 with respect to a blu-ray disc, a numerical aperture of 0.53 with respect to a DVD, and a numerical aperture of 0.44 with respect to a CD.

12. The optical pickup apparatus of claim 10, wherein the light generating unit comprises:

a two-wavelength light source module comprising the light source for the CD and the light source for the DVD; and a light source module for a blu-ray disc comprising the light source for the blu-ray disc.

13. The optical pickup apparatus of claim 12, further comprising:

a photodetector to detect the light reflected from the disk;

a first beam splitter to reflect a light emitted from the two-wavelength light source module and to transmit a light emitted from the light source module for the blu-ray disc; and a second beam splitter to reflect the light incident from the first beam splitter toward the objective lens and to transmit the light incident from the objective lens toward the photodetector.

14. The optical pickup apparatus of claim 13, wherein, when a P-polarized light enters, the second beam splitter reflects one half of the P-polarized light and transmits the other half of the P-polarized light.

15. An optical device, comprising:

a disc holder to hold a disc to store data; and an optical pickup apparatus to perform at least one of reading data from the disc and writing data to the disc, the optical pickup apparatus comprising:

a multi-sectional polarizer including at least two sections each having a respective optical axis to polarize light passing through the multi-sectional polarizer to the disc into at least two different orientations according to the respective optical axes, wherein an optical axis of each section that shares a same center axis is parallel to each other optical axis of each other section that shares the same center axis, and each optical axis is non-co-linear with a respective center axis, and at least two sections that share the same center axis are positioned at acute angles with respect to the shared center axis.

16. The optical device according to claim 15, wherein the disc is one of a CD, a DVD, and a blu-ray disc.

17. The optical device according to claim 15, further comprising:

a controller to control the optical pickup to read data from and write data to the disc.

* * * * *